US007497202B2

(12) United States Patent
Cvengros et al.

(10) Patent No.: US 7,497,202 B2
(45) Date of Patent: Mar. 3, 2009

(54) HYDRAULIC DAMPER ELEMENT

(75) Inventors: Derek Cvengros, Livonia, MI (US); Dewey M. Sims, Jr., Wayne, MI (US); Hursha Shankaranarayan, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/955,921

(22) Filed: Dec. 13, 2007

(65) Prior Publication Data

US 2008/0087253 A1 Apr. 17, 2008

Related U.S. Application Data

(63) Continuation-in-part of application No. 10/966,931, filed on Oct. 15, 2004, now Pat. No. 7,341,045.

(51) Int. Cl.
*F02M 55/02* (2006.01)
*F02M 59/46* (2006.01)
*F02M 69/46* (2006.01)
*F16L 55/04* (2006.01)

(52) U.S. Cl. ...................... 123/456; 123/467; 123/468; 138/30

(58) Field of Classification Search ................. 123/456, 123/467, 468, 469; 138/26, 30
See application file for complete search history.

(56) References Cited

U.S. PATENT DOCUMENTS

| | | | | |
|---|---|---|---|---|
| 1,058,572 | A | 4/1913 | Finlay | |
| 2,409,304 | A | 10/1946 | Morrison | |
| 2,530,190 | A | 11/1950 | Carver | |
| 2,599,325 | A | 6/1952 | Fritzberg | |
| 3,154,037 | A | 10/1964 | Mayrath | |
| 3,227,147 | A | 1/1966 | Gossiaux | |
| 4,056,679 | A | 11/1977 | Brandt et al. | |
| 4,154,264 | A * | 5/1979 | Schaller | 138/26 |
| 4,295,452 | A | 10/1981 | Lembke et al. | |
| 4,328,836 | A * | 5/1982 | Petrie | 138/30 |
| 4,649,884 | A | 3/1987 | Tuckey | |
| 4,651,781 | A | 3/1987 | Kandelman | |
| 4,660,524 | A | 4/1987 | Bertsch et al. | |
| 4,729,360 | A | 3/1988 | Fehrenbach et al. | |
| 4,782,570 | A | 11/1988 | Spridco | |
| 4,823,844 | A | 4/1989 | Bartholomew | |
| 4,852,615 | A * | 8/1989 | Stil | 138/30 |
| 4,861,238 | A | 8/1989 | Kamiyama et al. | |
| 5,024,198 | A | 6/1991 | Usui | |

(Continued)

FOREIGN PATENT DOCUMENTS

DE 3842298 A1 6/1990

(Continued)

*Primary Examiner*—Thomas N Moulis
(74) *Attorney, Agent, or Firm*—Michael Best & Friedrich LLP

(57) ABSTRACT

A damper element for damping pressure pulsations in a liquid includes a first side including a first wall portion at least partially defining a chamber containing a gas and a second side including a second wall portion at least partially defining the gas-containing chamber. The second side is overlappingly joined with the first side such that the first and second wall portions combine to define substantially an entire cross-section of the gas-containing chamber. Both the first and second wall portions are convexly curved outwardly away from the gas-containing chamber.

19 Claims, 12 Drawing Sheets

U.S. PATENT DOCUMENTS 5,058,627 A 10/1991 Brannen
5,374,169 A 12/1994 Talaski
5,505,181 A 4/1996 McRae et al.
5,538,043 A 7/1996 Salazar
5,570,762 A 11/1996 Jentsch et al.
5,575,262 A 11/1996 Rohde
5,607,035 A 3/1997 Fulks et al.
5,617,827 A 4/1997 Eshleman et al.
5,620,172 A 4/1997 Fulks et al.
5,645,127 A 7/1997 Enderle et al.
5,687,958 A 11/1997 Renz et al.
5,709,248 A * 1/1998 Goloff ......................... 138/30
5,845,621 A 12/1998 Robinson et al.
5,894,861 A 4/1999 Lorraine
5,896,843 A 4/1999 Lorraine
6,032,651 A 3/2000 Field
6,205,979 B1 3/2001 Sims, Jr. et al.
6,314,942 B1 11/2001 Kilgore et al.
6,371,083 B1 4/2002 Rossi et al.
6,390,131 B1 5/2002 Kilgore
6,418,909 B2 7/2002 Rossi et al.
6,513,500 B2 2/2003 Braun et al.
6,651,627 B2 11/2003 Zdroik et al.
6,655,354 B2 12/2003 Curran et al.
6,672,286 B2 1/2004 Miandoab et al.
6,761,150 B2 7/2004 Zdroik
6,935,314 B2 8/2005 Zdroik et al.
7,036,487 B2 * 5/2006 Braun et al. ................ 123/467
7,165,535 B2 * 1/2007 Braun et al. ................ 123/467
2004/0035399 A1 2/2004 Curran et al.
2004/0107943 A1 6/2004 Alder et al.
2006/0081220 A1 4/2006 Sims, Jr. et al.

FOREIGN PATENT DOCUMENTS

GB 890895 3/1962
WO 01/07776 A1 2/2001

* cited by examiner

HYDRAULIC DAMPER ELEMENT

CROSS-REFERENCE TO RELATED APPLICATIONS

This application is a continuation-in-part of prior filed U.S. patent application Ser. No. 10/966,931 filed on Oct. 15, 2004 now U.S. Pat. No. 7,341,045 the entire contents of which are incorporated by reference herein.

BACKGROUND

The invention relates to fuel rails for the fuel system of an internal combustion engine, and more particularly to damper elements located within the fuel rails for damping pressure pulsations created by the fuel injectors.

It is known to use damper elements within the fuel rails of fuel-injected fuel systems. The damper elements minimize the otherwise negative effects (e.g., fuel line hammering, improper fuel distribution to injectors, etc.) that can result from pressure pulsations within the fuel rail.

SUMMARY

In one embodiment, the invention provides a damper element for damping pressure pulsations in a liquid. The damper element includes a first side including a first wall portion at least partially defining a chamber containing a gas and a second side including a second wall portion at least partially defining the gas-containing chamber. The second side is overlappingly joined with the first side such that the first and second wall portions combine to define substantially an entire cross-section of the gas-containing chamber. Both the first and second wall portions are convexly curved outwardly away from the gas-containing chamber.

In another embodiment, the invention provides a damper element for damping pressure pulsations in a liquid. The damper element includes a first side including a first wall portion and a second side including a second wall portion. The second side is joined with the first side to define at least one longitudinally extending contact zone along which the first and second sides are overlapped. A gas-containing chamber is formed solely by the first wall portion and the second wall portion. Both of the first and second wall portions are convexly curved outwardly away from the gas-containing chamber.

In yet another embodiment, the invention provides a damper element for damping pressure pulsations in a liquid. The damper element includes a first side including a first wall portion at least partially defining a chamber containing a gas and a second side including a second wall portion. The second side is joined with the first side, and the first and second wall portions define substantially an entire cross-section of the gas-containing chamber. First and second contact zones are defined between the first side and the second side. The first and second wall portions are substantially identical in shape, both the first and second wall portions having a uniformly bowed shape extending outwardly from the gas-containing chamber.

In yet another embodiment, the invention provides a method of producing a damper element having a sealed gas-containing for damping pressure pulsations in a fuel rail. The method includes stamping a first side of the damper element to include a first wall portion having a substantially constant radius and stamping a second side of the damper element to include a second wall portion having a substantially constant radius. The first and second sides are joined so that the first and second wall portions define substantially an entire cross-section of the gas-containing chamber.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
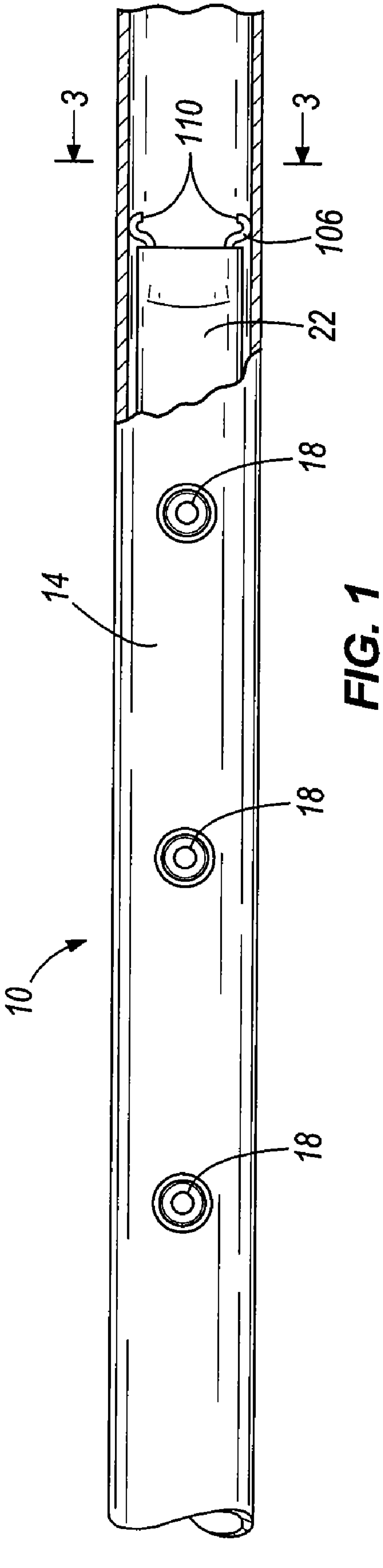
FIG. 1 illustrates a portion of a fuel rail, partially broken away, and containing a damper element embodying the invention.

FIG. 1 illustrates a fuel rail assembly 10 including a fuel rail 14 and a plurality of fuel injectors 18 coupled to the fuel rail 14. The illustrated fuel rail 14 is configured to contain fuel pressurized from about 4 bar to about 150 bar above the ambient pressure. A damper element 22 embodying the invention is positioned inside the fuel rail 14 for damping pressure pulsations in the fuel that are created by the operation of the fuel injectors 18. The damper element 22 is well-suited for operation within the pressure ranges set forth above, and the damping characteristics of the damper element 22 will not be significantly affected by the standard operating temperatures within the fuel rail 14. Additionally, the illustrated damper element 22 can also be used in lower pressure fuel rail systems typically operating at about 2 to about 4 bar above ambient pressure, and provides a more efficient alternative to existing damper elements.

FIGS. 2-10 illustrate the damper element 22 in greater detail. While the damper element 22 is illustrated as being used in conjunction with a fuel-injected fuel system, it is to be understood that the damper element 22 can also be used in other applications where pressure pulsations within a liquid require damping.

Figure 2:
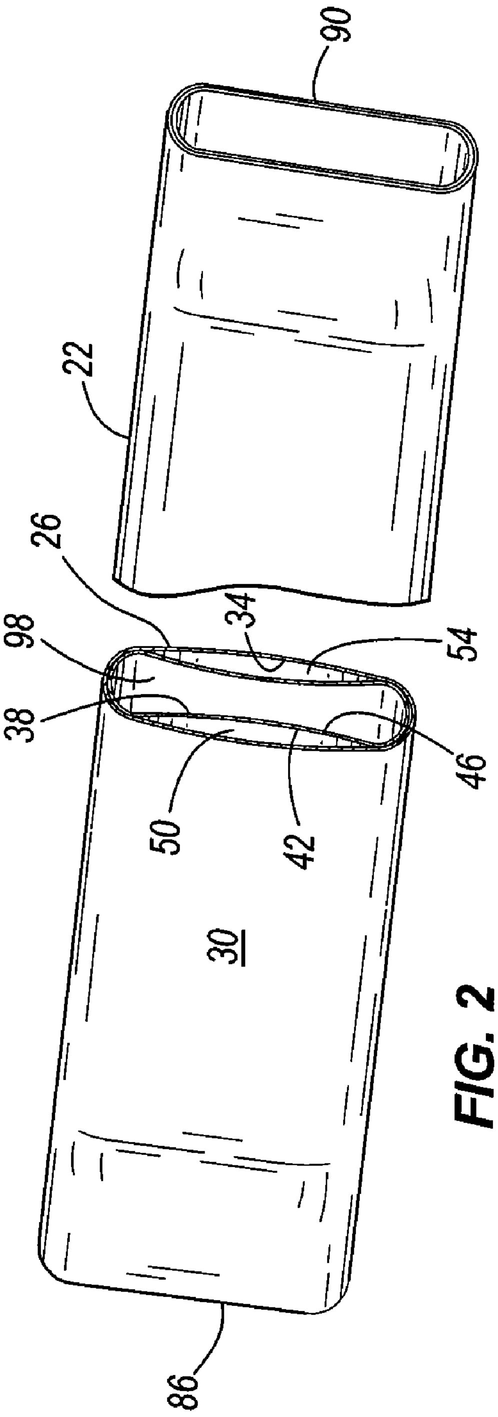
FIG. 2 is perspective view, shown partially in section, of the damper element of FIG. 1.
Figure 7:
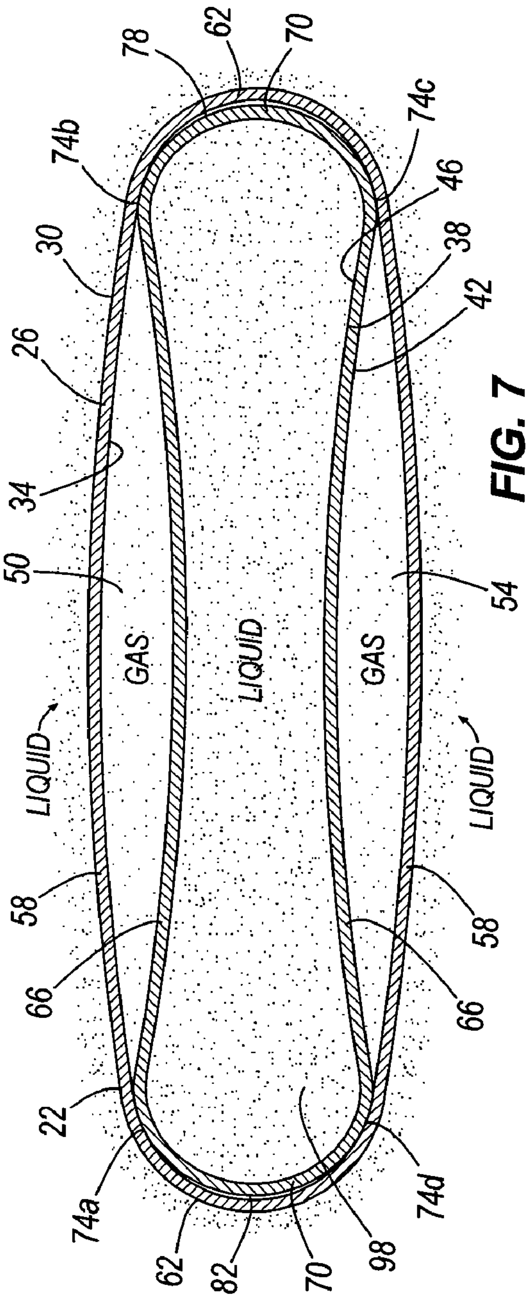
FIG. 7 is a section view taken along line 7-7 of FIG. 6.

With initial reference to FIGS. 2 and 7, the damper element 22 includes an outer tube 26 having an outer surface 30 and an inner surface 34 defining an interior cavity. The damper element 22 also includes an inner tube 38 having an outer surface 42 and an inner surface 46. The inner tube 38 is positioned within the interior cavity of the outer tube 26 such that at least one chamber for receiving a compressible gas is defined between the inner surface 34 of the outer tuber 26 and the outer surface 42 of the inner tube 38. In the illustrated embodiment, there are two main chambers 50, 54 defined between the inner surface 34 of the outer tube 26 and the outer surface 42 of the inner tube 38.

The two chambers 50, 54 are defined by the respective contouring of the inner and outer tubes 38 and 26. More specifically, and with reference to FIG. 7, the outer tube 26 includes opposite convexly-contoured side portions 58 interconnected by opposite arcuate portions 62. The inner tube 38 includes opposite concavely-contoured side portions 66 interconnected by opposite arcuate portions 70. For purposes of this description, the terms convex and concave describe the curvature taken with respect to the outer surfaces of the tubes 26, 38. The first chamber 50 is defined between one of the convexly-contoured side portions 58 of the outer tube 26 and one of the concavely-contoured side portions 66 of the inner tube 38. The second chamber 54 is defined between the other of the convexly-contoured side portions 58 of the outer tube 26 and the other of the concavely-contoured side portions 66 of the inner tube 38. More generally, the convexly-contoured side portions 58 of the outer tube 26 define wall portions that extend away from the inner tube 38, and the concavely-contoured side portions 66 of the inner tube 38 define wall portions that extend away from the outer tube 26. These oppositely-extending wall portions together define the respective chambers 50, 54.

In the illustrated embodiment, and with continued reference to FIG. 7, the inner tube 38 is press-fit into the interior cavity of the outer tube 26 to define at least two, and more likely four longitudinally-extending zones of contact 74*a-d* between the inner surface 34 of the outer tube 26 and the outer surface 42 of the inner tube 38. The zones of contact 74*a* and 74*b* define the lateral extents of the chamber 50 and the zones of contact 74*c* and 74*d* define the lateral extents of the chamber 54. As best shown in FIG. 7, two small chambers 78 and 82 are formed between the opposite arcuate portions 62 of the outer tube 26 and the respective opposite arcuate portions 70 of the inner tube 38. The zones of contact 74*b* and 74*c* define the lateral extents of the chamber 78, while the zones of contact 74*a* and 74*d* define the lateral extents of the chamber 82.

In the illustrated embodiment, the zones of contact 74*a-d* are formed by the press-fit operation only, and no welding or other bonding techniques are utilized. Such additional bonding in the areas of the zones of contact 74*a-d* could result in increased stresses created in the damper element 22. In addition, while the four zones of contact 74*a-d* could be reduced to two zones of contact by having the inner and outer tubes 38, 26 contact one another along the entire areas between the zones of contact 74*b* and 74*c*, and between the zones of contact 74*a* and 74*d*, such large areas of contact would also significantly increase the stresses created in the damper element 22, and as such, would not be as advantageous as the illustrated construction incorporating the small chambers 78 and 82. In yet another alternative embodiment, the two zones of contact need not extend substantially the entire distance between the illustrated zones of contact 74*b* and 74*c*, and 74*a* and 74*d*, respectively, but rather could be formed at locations intermediate the points 74*b* and 74*c*, and 74*a* and 74*d*, respectively (e.g., at the apices of the arcuate portions 70).

Figure 5B:
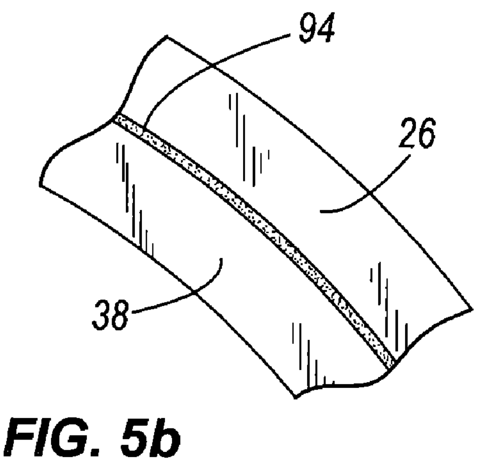
FIG. 5*b* is an enlarged section view of a portion of the damper element illustrated in FIG. 5*a*.
Figure 5A:
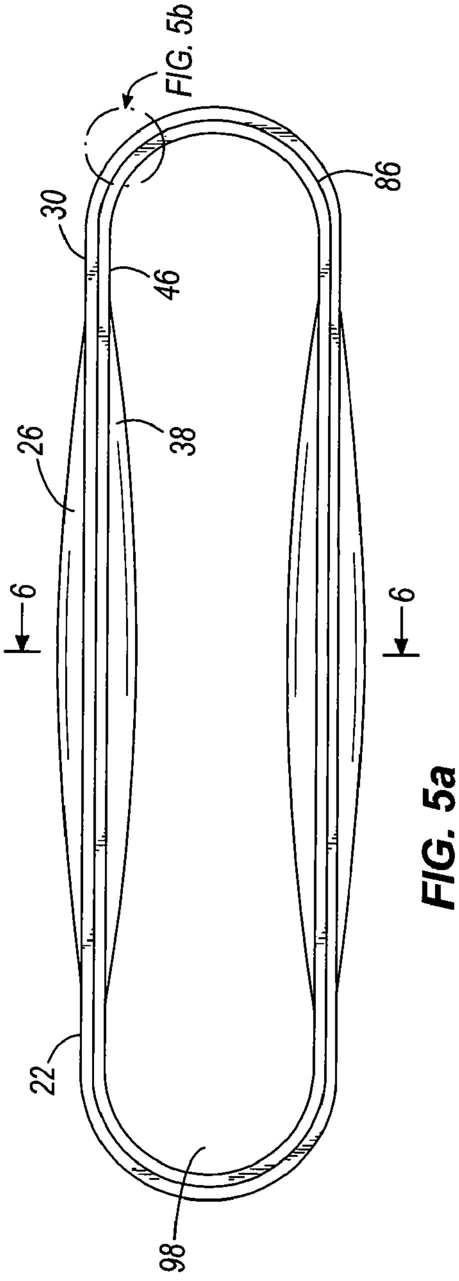
FIG. 5*a* is an end view of the damper element of FIG. 2.
Figure 6:
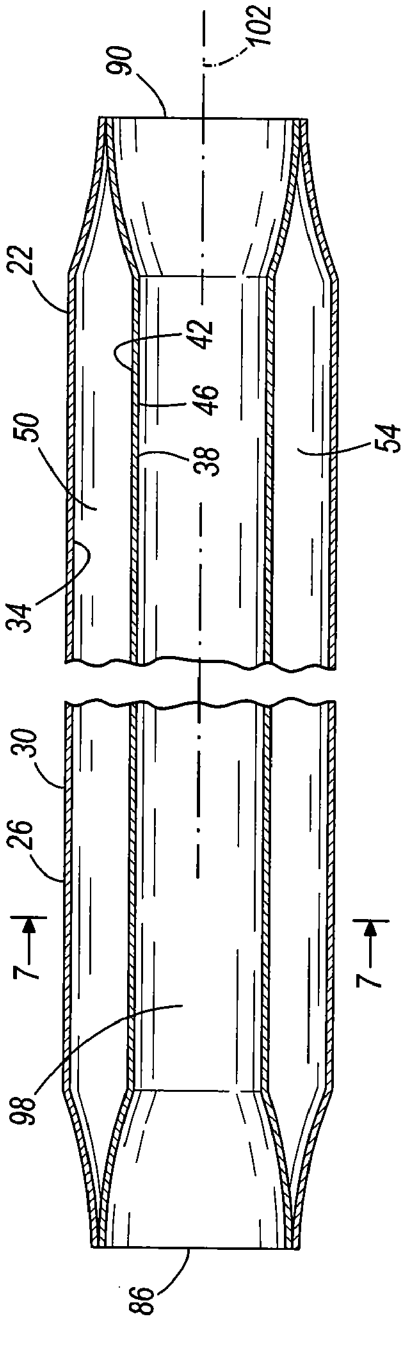
FIG. 6 is a section view taken along line 6-6 of FIG. 5*a*.

As shown in FIGS. 2 and 6, the damper element 22 has a first end 86 defined by the first ends of the inner and outer tubes 38, 26, and a second end 90 defined by the second ends of the inner and outer tubes 38, 26. With reference to FIGS. 5*a* and 5*b*, the respective ends of the inner and outer tubes 38, 26 are sealed to one another along their peripheries, thereby sealing the chambers 50, 54, 78, and 82. As shown in FIG. 5*b*, a sealing layer 94 is formed between the outer and inner tubes 26, 38 by brazing, welding, or other suitable sealing techniques. Any suitable compressible gas (e.g., air, helium, etc.) can be introduced into the chambers 50, 54, 78, and 82 prior to the final sealing of the ends 86 and 90. In the illustrated embodiment, at least ninety-eight percent of the compressible gas is located in the chambers 50 and 54, with only a minimal amount of the compressible gas in the smaller chambers 78 and 82.

The assembled damper element 22 defines an exterior surface (i.e., the outer surface 30 of the outer tube 26) and an interior surface (i.e., the inner surface 46 of the inner tube 38). As shown in FIGS. 7-10, when the damper element 22 is inserted into the fuel rail 14, the exterior surface is surrounded by liquid fuel in the fuel rail 14. Additionally, the interior surface of the damper element 22 defines a passageway 98 extending through the damper element 22 and that is filled by the liquid fuel in the fuel rail 14. Thus, unlike prior art damper elements which define a single, relatively voluminous enclosed gas chamber surrounded on the outside by the liquid fuel, the damper element 22 defines at least two relatively less voluminous, distinct chambers 50, 54 that are symmetrically positioned about a longitudinal axis 102 (see FIG. 6) of the damper element 22. The chambers 50, 54 are spaced apart by the passageway 98 such that both chambers 50, 54 are surrounded by fuel outside the damper element 22 and within the passageway 98 of the damper element 22.

With the two chambers 50, 54 formed on opposite sides of the passageway 98, the damper element 22 has four surfaces that move and deform in response to pressure changes in the fuel. This is twice as many moving surfaces as found on prior art, single-chamber, generally oval-shaped dampers having only two moving surfaces. More moving surfaces and more gas chambers allow a greater volume change of the gas in the chambers 50, 54. Greater volume change results in better damping of pressure pulsations. Thus, for a damper element of generally the same size, material, and material thickness, the two-chamber design of the damper element 22 will experience about two times more gas volume change per bar of fuel pressure change, thereby significantly improving the damping characteristics of the damper element 22 in relation to prior art dampers.

Figure 8:
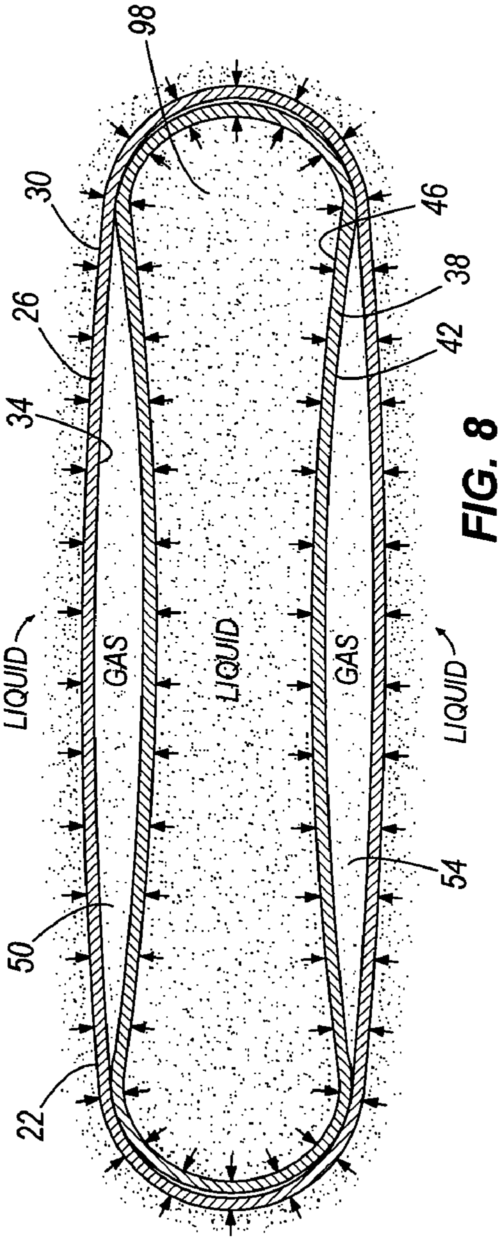
FIG. 8 is a section view similar to FIG. 7 illustrating the damper element in a first substantially deformed state resulting from a first surrounding liquid pressure.

The damper element 22 achieves this increased gas volume change capacity while displacing significantly less fuel than prior art, single-chamber dampers having generally the same outer dimensions. Specifically, the total gas volume in the two chambers 50, 54 is significantly less than the gas volume in a single-chamber, prior art damper having the same outer dimensions. This is due to the passageway 98 between the two chambers, which does not displace any fuel, but rather is filled with the fuel. FIG. 7 illustrates the damper element 22 within the fuel rail when the surrounding fuel is at the ambient pressure (i.e., when the fuel in the fuel rail 14 is not pressurized). FIG. 8 illustrates the damper element 22 in its deformed state when the fuel in the fuel rail 14 is pressurized to the operating pressure (e.g., to about eight bar above ambient pressure). Notice that in FIG. 8, the fuel displacement by the gas volume in the chambers 50, 54 is substantially less than that shown in FIG. 7 just by pressuring the fuel to the normal operating pressure.

The smaller fuel displacement achieved with the damper element 22 means that there is more fuel in the fuel rail 14. Increasing the amount of fuel in the fuel rail 14 reduces the risk of "hot start" and "hot drive away" problems. These are problems that occur when a percentage of the fuel in the fuel rail 14 changes from liquid to vapor. The injectors require liquid fuel to properly supply the combustion chambers, and too much fuel vapor in the rail 14 can be problematic. Because the damper element 22 displaces less fuel than prior art dampers, there is more liquid fuel in the fuel rail. With more liquid fuel, there is a better likelihood that the engine will be able to run long enough with the liquid fuel to properly pressurize and cool the fuel rail 14, thereby allowing any fuel vapor to return to the liquid state. Increasing the amount of fuel in the fuel rail 14 is also advantageous because the fuel in the fuel rail 14 is a compressible liquid that can contribute to pressure pulsation damping.

Figure 9:
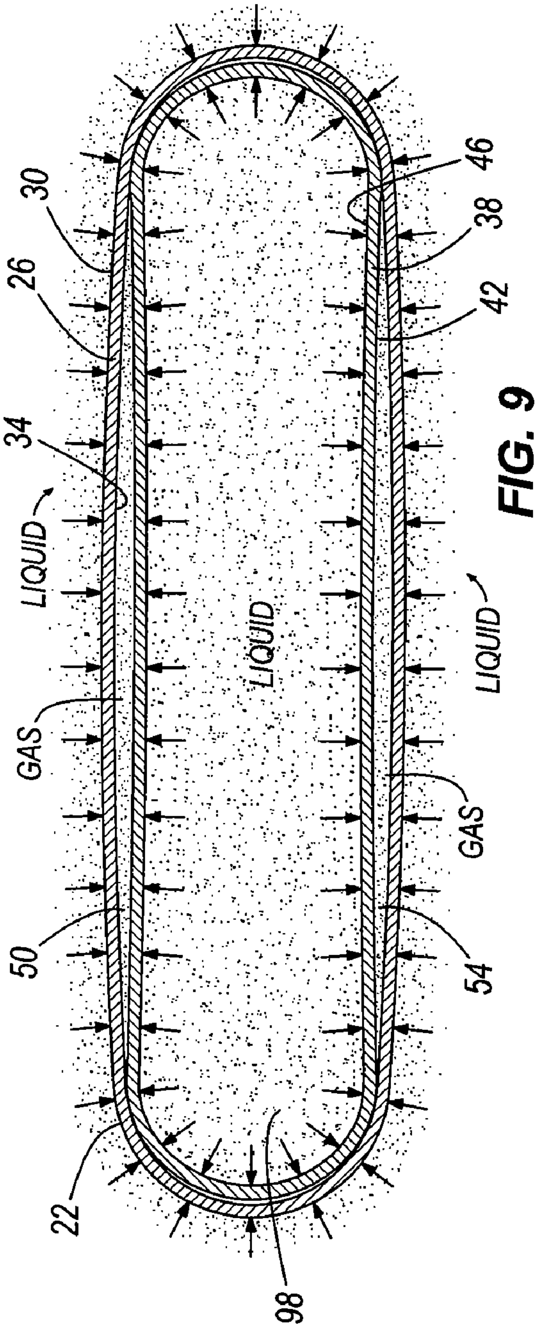
FIG. 9 is a section view similar to FIG. 8 illustrating the damper element in a second substantially deformed state resulting from a second surrounding liquid pressure.
Figure 10:
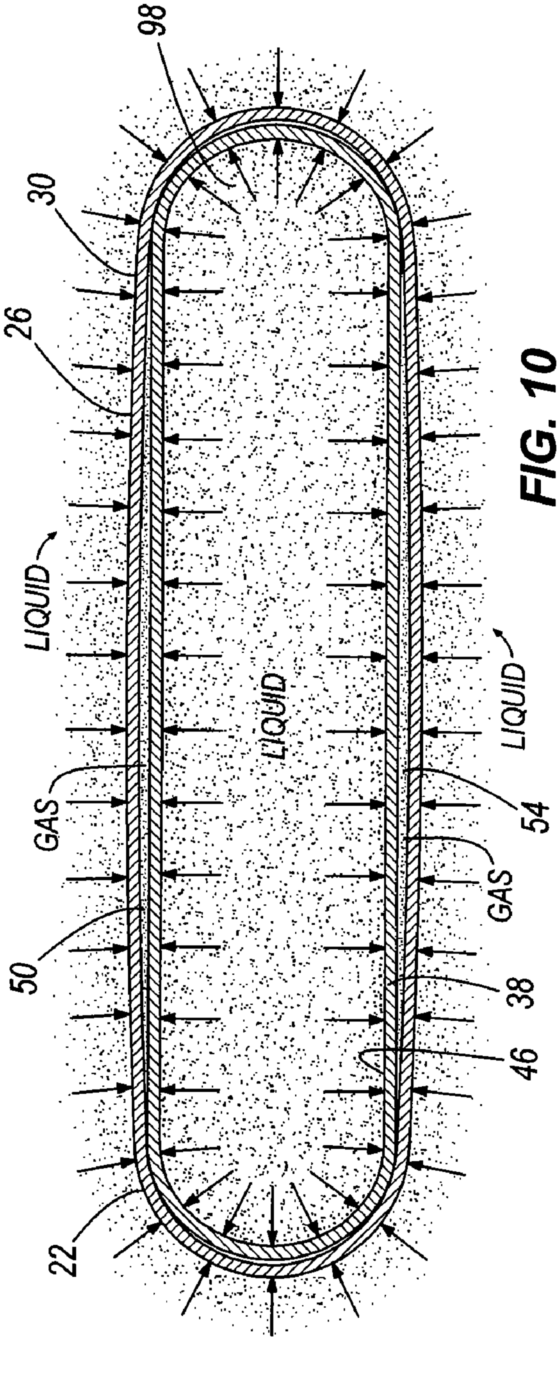
FIG. 10 is a section view similar to FIG. 9 illustrating the damper element in a third substantially deformed state resulting from a third surrounding liquid pressure.

FIG. 9 illustrates the damper element 22 in its deformed state when the fuel pressure in the fuel rail 14 is further increased from the pressure shown in FIG. 8 due to pressure pulsations in the fuel rail 14 (e.g., to about eleven bar above ambient pressure). FIG. 10 illustrates the damper element 22 in its deformed state when the fuel pressure in the fuel rail 14 is further increased toward the maximum expected fuel pressure (e.g., to about 150 bar above ambient pressure). The damper element 22 allows the inner tube 38 and the outer tube 26 walls to come very close together without overstressing the metal tubes. This allows the gas in the chambers 50, 54 to be compressed to a very high pressure without overstressing the metal tubes 26, 38. This significant gas chamber compression was not possible with prior art damper designs.

The tubes 26, 38 are made from any suitable fuel-resistant metals that have a high ratio of endurance strength to modulus of elasticity. These materials can reliably provide the larger gas chamber volume change per bar of fuel pressure change sought by the present damper element design. Examples of suitable materials include stainless steels and precision drawn aluminum tubing that is anodized or otherwise treated for corrosion resistance.

The damper element 22 makes use of all three available "springs" in the fuel rail system to dampen pressure pulsations. First, as discussed above, by displacing less fuel than prior art fuel rails, the damper element 22 makes use of a greater fuel spring present in the increased amount of compressible fuel in the fuel rail 14. Second, the damper element 22 makes use of the metal spring that is the bending and deformation of the inner and outer tubes 38, 26. Third, the damper element 22 makes greatly increased use of the gas spring that is the compression of the gas housed within the chambers 50 and 54. The damper element 22 uses these three "springs," and most significantly, the combined metal spring and gas spring to balance the outside forces of the fuel pressure acting on the damper element 22.

The metal spring has a linear spring rate, while the gas spring has a non-linear spring rate. The linear spring rate of the metal tube surfaces contributes significantly to increasing the volume change in the chambers 50, 54 per bar of change in fuel pressure. The non-linear spring rate of the gas in the chambers 50, 54 helps to greatly dampen the natural frequency of the metal tube surfaces, meaning that the chances that the damper element 22 will be excited by external vibration inputs is greatly reduced. This enables the damper element 22 to dampen more effectively.

While the damping characteristics of prior art single-chamber dampers are mainly a function of the metal spring of the moving damper walls, the damper element 22 relies much more on the increased gas spring capacity that exists due to the presence of the two gas chambers 50, 54. The wall thickness of the tubes 26, 38 can be reduced due to the ample gas spring provided by the compressed gas in the relatively small-volume chambers 50, 54. Thinner tube walls result in an increased ability of the walls to deflect, thereby increasing the gas volume change capability of the damper element 22. The increased gas spring helps insure that the thinner metal will not be overstressed and that it will still meet the fatigue life for the damper element 22. In the illustrated embodiment, the fatigue endurance requirement is based on 1,000,000 fuel pressure cycles taken from ambient pressure to the fuel rail operating pressure and back to the ambient pressure. Because of the thinner tube walls and the increased gas spring, the rate of acceleration of the damper element moving surfaces is increased, providing a damper element 22 that is extremely sensitive to pressure changes in the fuel rail 14 and that quickly reacts to these pressure changes. Additionally, the low mass of the moving walls combined with the high spring rate of the damper element 22 produces a damper that has a very high natural frequency that will be more effective at damping the pressure pulsations in the fuel rail.

The inner and outer tubes 38, 26 of the damper element 22 are designed using finite element analysis (FEA) or other suitable modeling techniques to achieve the desired cross-sectional tube configurations. Starting with a generally oval shape (as shown in FIG. 2 at the end 90) for the inner tube 38, a small external pressure (P1) is applied to the FEA model to determine the maximum stress (S1max) in this model as a function of this small external pressure (P1). The fatigue endurance strength (ES) based on the tube material being modeled is known. Next, a new external pressure (P2) substantially equal to ((ES/S1max)*P1) is applied to the model to determine the deflection that will ultimately define the concavely-contoured side portions 66. Then, if it is verified that the maximum stress in this FEA model at the new pressure (P2) is substantially equal to the fatigue endurance strength (ES) of the material, the shape of the inner tube 38 that was created by the external pressure (P2) will be used for the manufactured inner tube 38 in its free state (i.e., the shape with no pressure acting on the inner tube 38). To verify that this resultant cross-sectional shape for the inner tube 38 is appropriate, it is then modeled with an internal pressure (P2) applied to the FEA model with the following results: (1) the maximum stress (S1max) was equal to the fatigue endurance strength (ES); and (2) the shape returned to the original generally oval shape (as shown in FIG. 2 at the end 90). The inner tube 38 can then be formed to this shape via extrusion or other suitable forming processes. If the inner tube 38 is extruded, but yet requires a longitudinal weld, the weld should be located at the lowest stress area of the tube 38.

The outer tube 26 is designed similarly. Starting with a generally oval shape (as shown in FIG. 2 at the end 90) for the outer tube 26, a small internal pressure (P1) is applied to the FEA model to determine the maximum stress (S1max) in this model as a function of this small internal pressure (P1). The fatigue endurance strength (ES) based on the tube material being modeled is known. Next, a new internal pressure (P2) substantially equal to ((ES/S1max)*P1) is applied to the model to determine the deflection that will ultimately define the convexly-contoured side portions 58. Then, if it is verified that the maximum stress in this FEA model at the new pressure (P2) is substantially equal to the fatigue endurance strength (ES) of the material, the shape of the outer tube 26 that was created by the internal pressure (P2) will be used for the manufactured outer tube 26 in its free state (i.e., the shape with no pressure acting on the outer tube 26). To verify that this resultant cross-sectional shape for the outer tube 26 is appropriate, it is then modeled with an external pressure (P2) applied to the FEA model with the following results: (1) the maximum stress (S1max) was equal to the fatigue endurance strength (ES); and (2) the shape returned to the original generally oval shape (as shown in FIG. 2 at the end 90). The outer tube 26 can then be formed to this shape via extrusion or other suitable forming processes. As with the inner tube 38, if the outer tube 26 is extruded, but yet requires a longitudinal weld, the weld should be located at the lowest stress area of the tube 26.

This process can be remodeled for each change to the height, thickness, and/or width of each tube 26, 38. Each combination will be used to optimize the damper element 22 for package size and for the lowest ratio of change in displaced volume of the damper element 22 to change in pressure measured at the operating pressure of the fuel rail 14.

With this design method, each point on the inner and outer tubes 38, 26 will come together under pressure increases at the same rate in a very controlled manner. Furthermore, the damper element 22 can be optimized for the operating pressure of the specific fuel rail 14 in which the damper element 22 will be used. The thickness and shapes of the tubes 26, 38 are selected based on an infinite fatigue life for the damper element 22. The design intent is to operate the damper element 22 at the endurance stress level for both the inner and outer tubes 38, 26. The volume of gas reduction in the chambers 50, 54 caused by the surfaces of the inner and outer tubes 38, 26 moving closer together until the endurance stress level is reached is used to determine the initial gas volume in the chambers 50, 54. Using the standard equation $P_1V_1=P_2V_2$, the gas pressure in the chambers 50, 54 can be determined for any point.

The design is optimized by getting the most metal spring possible from the thin metal tube walls, and then having the gas spring compensate for the remaining pressure differences. At pressures of more than forty bars above ambient, the thin metal walls of the damper element 22 provide little or no significant resistance to deflection, however, the increased gas pressure in the chambers 50, 54 resists deflection of the damper element walls to absorb the exterior pressures that would otherwise over-stress prior art dampers with walls of this thickness.

Figure 3:
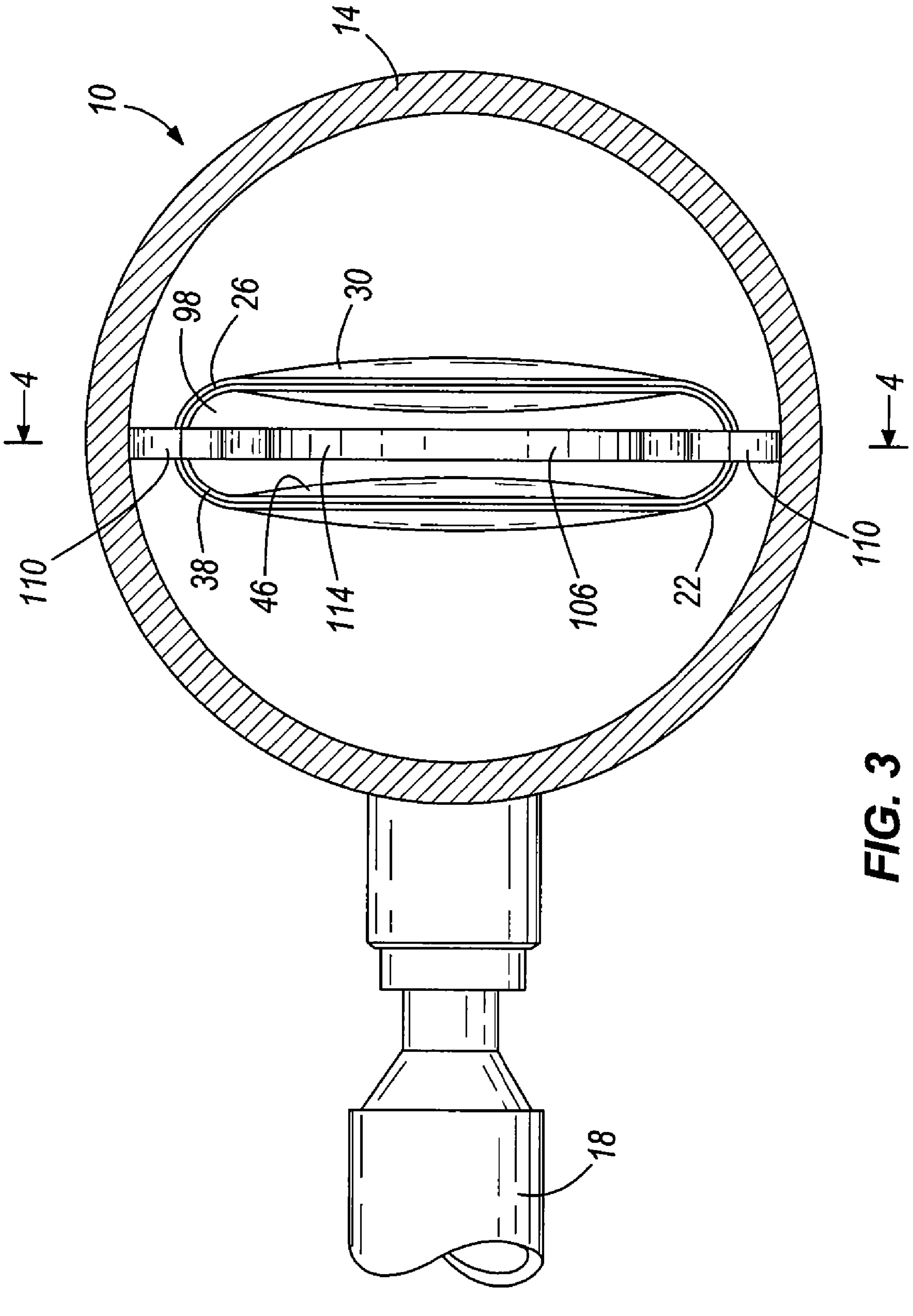
FIG. 3 is a section view taken along line 3-3 of FIG. 1.
Figure 4:
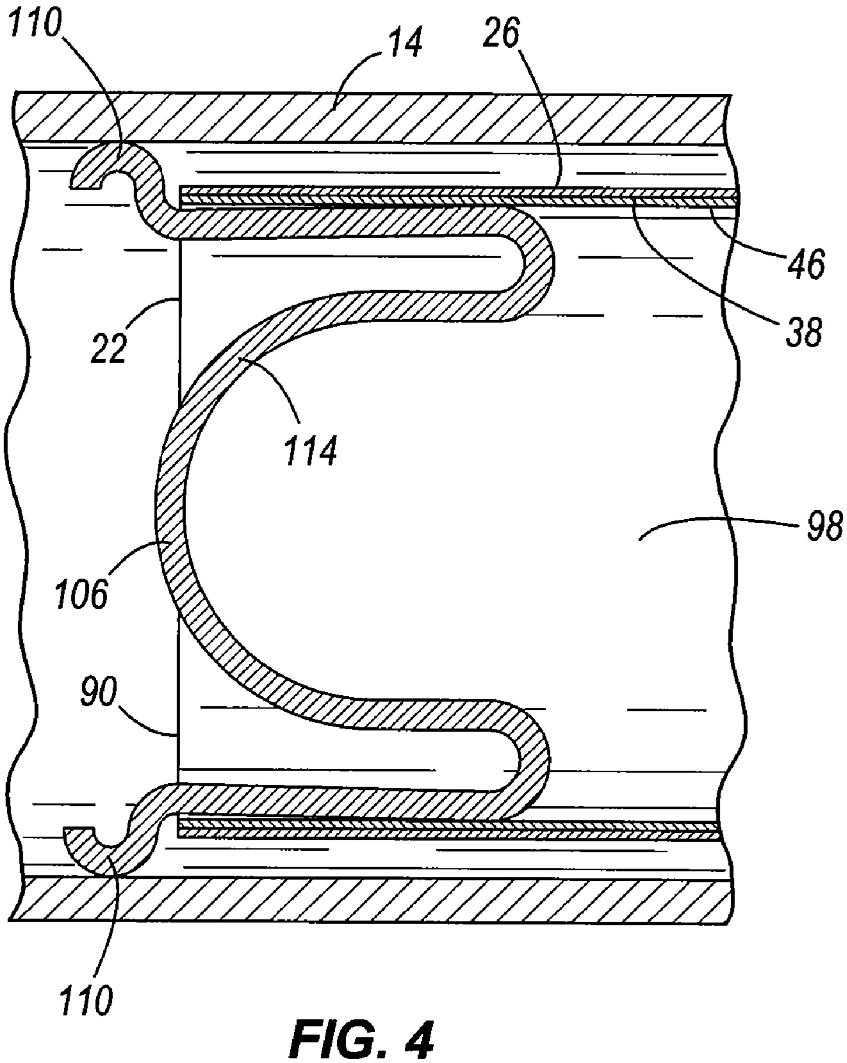
FIG. 4 is a section view taken along line 4-4 of FIG. 3.

With reference to FIGS. 1, 3, and 4, the damper element 22 is positioned within the fuel rail 14 using resilient locating members 106 (only one is shown). The illustrated locating member 106 is made of spring steel and includes opposite end portions 110 configured to be biased into engagement with the inner surface of the fuel rail 14. A resilient body portion 114 extends between the end portions 110 and is configured to be received in the passageway 98 of the damper element and to engage the inner surface 46 of the inner tube 38, thereby supporting and positioning the damper element 22 within the fuel rail 14. While the locating member 106 is shown as having a square cross-section, those skilled in the art will understand that other suitable cross-sectional shapes (e.g., round, rectangular, etc.) can also be substituted. Additionally, those skilled in the art will understand that alternative methods of positioning the damper element 22 in the fuel rail 14 can also be used.

FIGS. 11-17 illustrate a fuel rail assembly 210 or portions thereof including a fuel rail 214 and a plurality of fuel injectors 218 coupled to the fuel rail 214. The illustrated fuel rail 214 is configured to contain pressurized fuel and may be similar to the fuel rail 14, which is discussed in detail above. A damper element 222 embodying the invention is positioned inside the fuel rail 214 for damping pressure pulsations in the fuel that are created by the operation of the fuel injectors 218. In many aspects, the damper element 222 is similar to the damper element 22 illustrated in FIGS. 1-10 and discussed above, and reference is hereby made to the above description insofar as some of the commonalities are not specifically reiterated below with respect to the damper element 222 shown in FIGS. 11-17. In addition, although some of the details below that describe the damper element 222 of FIGS. 11-17 are not shared with the damper element 22 of FIGS. 1-10, much of the description below points out features that are also found in the damper element 22 of FIGS. 1-10, although they may not be described with specific reference thereto.

Figure 12:
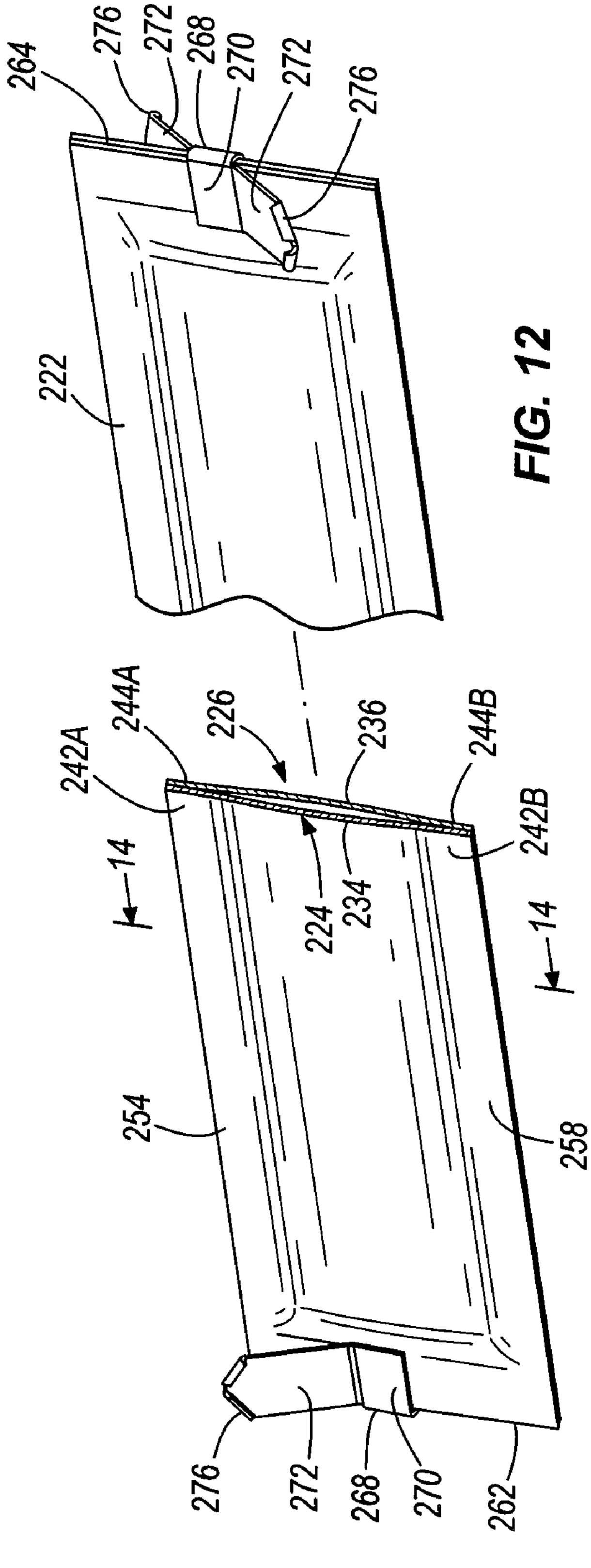
FIG. 12 is perspective view, shown partially in section, of the damper element of FIG. 11.
Figure 13:
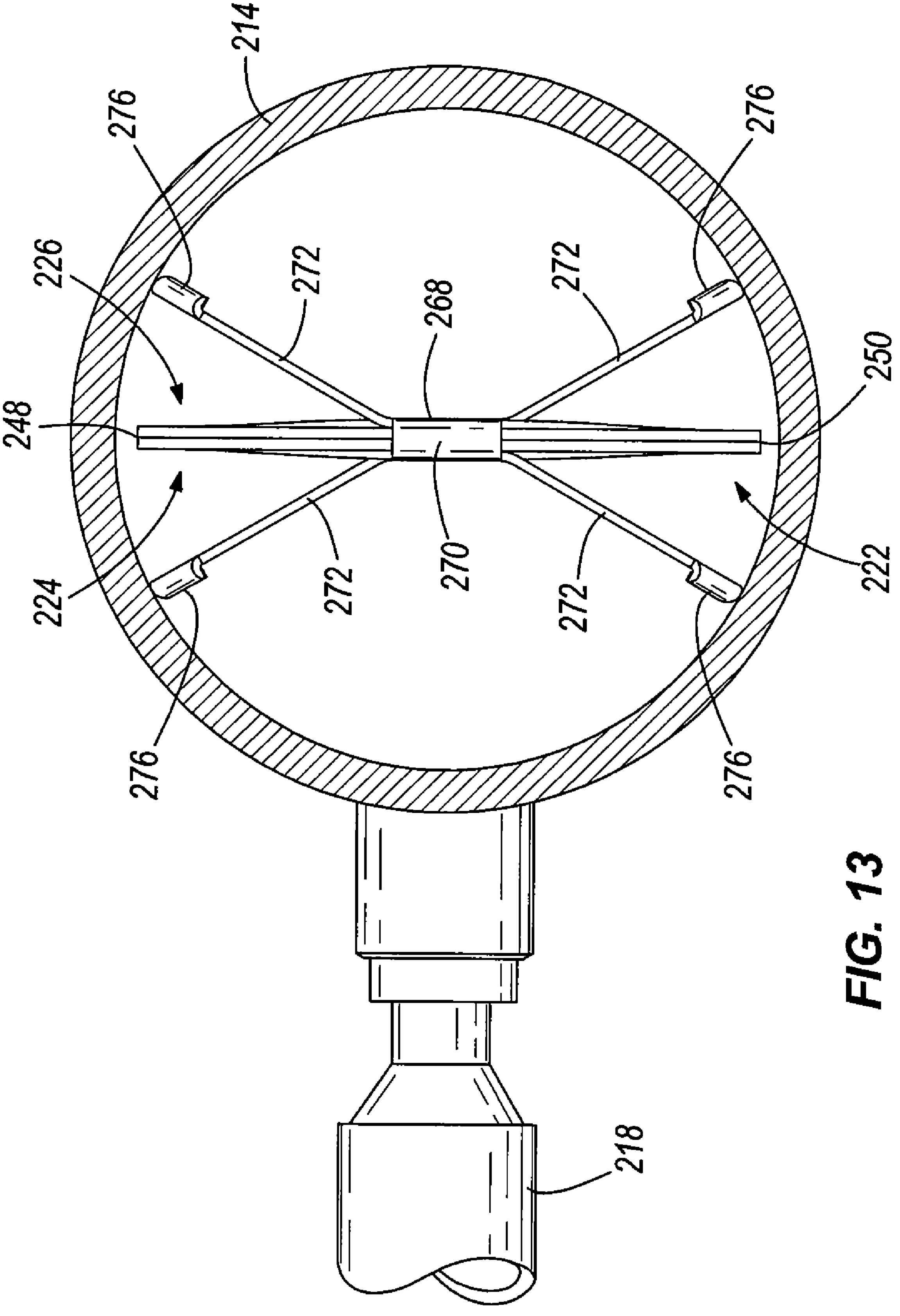
FIG. 13 is a section view of the damper element taken along line 13-13 of FIG. 11.
Figure 14:
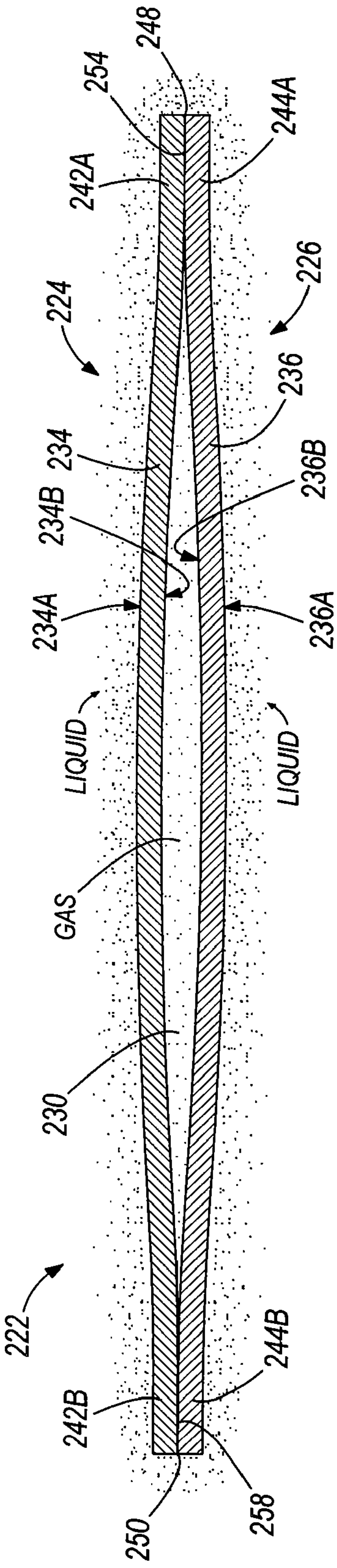
FIG. 14 is a section view of the damper element taken along line 14-14 of FIG. 12.

FIGS. 12-17 illustrate the damper element 222 in greater detail. The damper element 222 includes a first side 224 and a second opposing side 226 and further defines a chamber 230, substantially an entire cross-section of which is formed by a pair of convexly-curved wall portions 234, 236. As used in reference to the wall portions 234, 236 of the damper element 222, the term convex describes the curvature with respect to the respective outer surfaces 234A, 236A of the wall portions 234, 236. Furthermore, in the illustrated embodiment, each of the wall portions 234, 236 defines a single or substantially constant radius of curvature as viewed in cross-section (FIG. 14). Thus, the wall portions 234, 236 do not include any bends, creases, angles, or planar portions, but rather are substantially uniformly bowed. The respective inner surfaces 234B, 236B of the wall portions 234, 236 that define the chamber 230 generally follow the curvature defined by the outer surfaces 234A, 236A as the wall portions 234, 236 are of substantially uniform thickness. Therefore, the wall portions 234, 236 are generally bowed outwardly from each other as shown in the cross-section view of FIG. 14 to define a volume within the chamber 230.

The radius of each of the wall portions 234, 236 (as viewed in FIG. 14) is between about 50 millimeters and about 100 millimeters when the damper element 222 is in an unstressed state. In the illustrated embodiment, each of the wall portions 234, 236 has a radius of about 77 millimeters when the damper element 222 is in an unstressed state. The shape of the wall portions 234, 236 may change as the damper element 222 is exposed to external fuel pressures as further described below. Whether stressed or unstressed, the radii of the wall portions 234, 236 are substantially uniform along substantially the entire length of the damper element 222.

A first flange portion 242A extends from the first wall portion 234 in a direction away from the chamber 230. A second flange portion 244A extends from the second wall portion 236 in a direction away from the chamber 230 and substantially parallel to the first flange portion 242A. The first and second flange portions 242A, 244A are joined together in an overlapping arrangement to seal the chamber 230 along one edge 248. In some embodiments, the flange portions 242A, 244A are welded or brazed together, although other means for joining the flange portions 242A, 244A can be substituted. In the illustrated embodiment, the first and second sides 224, 226 include additional respective flange portions 242B, 244B extending in a direction away from the chamber 230 and opposite the first and second flange portions 242A, 244A to define a second overlapping joint along a second edge 250 (which may be welded or brazed together in some embodiments to seal the chamber 230 along the second edge 250).

In the embodiment illustrated in FIGS. 12-17, the first side 224 and the second side 226 are formed separately from each other and joined together as described to define the chamber 230. For example, in some embodiments, the first side 224 and the second side 226 are stamped parts and the first side 224 is formed as a separate stamping from the second side 226 (either from the same sheet or different sheets of material).

The first and second flange portions 242A, 244A define a first longitudinal contact zone 254 between the first and second sides 224, 226, and the additional flange portions 242B, 244B define a second longitudinal contact zone 258 between the first and second sides 224, 226. In addition to being joined along the first and second edges 248, 250, the first and second sides 224, 226 are sealingly and overlappingly joined at a first end 262 and a second end 264 (FIG. 12), thus sealing the chamber 230 from the exterior of the damper element 222.

As described above, the chamber 230 is enclosed and as such is operable to contain a gaseous substance (referred to herein as "the gas"). The gas may primarily consist of a single element, such as nitrogen, argon, or helium, however the damper element 222 exhibits satisfactory performance with the chamber 230 containing an amount of air. When referring to the gas, the amount can be determined by mass or weight rather than by volume. The volume of the chamber 230 is configured to be dynamic during operation of the damper element 222 in the fuel rail 214 as discussed above in reference to the damper element 22 of FIGS. 1-10 and as described in brief detail further below with specific reference to the damper element 222 of FIGS. 11-17.

Although the chamber 230 is subject to a change in cross-sectional area (and a resulting change in volume) during operation, the design volume of the chamber 230 (unstressed) is an important factor in relation to the damping performance of the damping element 222. The volume cannot be any larger than the maximum operating volume based on the compliance of the device and the maximum system pressure the device will be used in. For example, the unstressed cross-sectional area (i.e., the cross-sectional area of the chamber 230 when the damper 222 is not exposed to pressures in excess of atmospheric pressure—see FIG. 14) of the chamber 230 can be between about 0.5 square millimeters and about 5.0 square millimeters. In some embodiments, the unstressed cross-sectional area (FIG. 14) of the chamber 230 is about 4.0 square millimeters. The unstressed internal width of the chamber 230 (i.e., the linear dimension between the first and second longitudinal contact zones 254, 258) is between about 9.6 millimeters and about 15.6 millimeters. In some embodiments, the unstressed internal width of the chamber 230 is about 14.4 millimeters. The overall length of the damper element 222 is between about 48 and 52 times the thickness of the first and second wall portions 234, 236 (which can range between about 0.20 millimeters and about 0.30 millimeters). In one construction, the overall length of the damper element 222 is about 230 millimeters.

Each of the first and second longitudinal contact zones 254, 258, where the respective flanges 242A, 242B, 244A, 244B are joined, has a width (FIGS. 14-17) of about 1 millimeter. The width of 1 millimeter provides a suitable area along which the first and second sides 224, 226 may be joined. The width of the first and second longitudinal contact zones 254, 258 can be increased larger than 1 millimeter (e.g., 2 millimeters or 3 millimeters), although such an increase may require reshaping of the chamber 230 to obtain the desired damping performance while remaining smaller than the internal diameter of the fuel rail 214. The first and second sides 224, 226 may be joined at the first and second ends 262, 264 with an arrangement similar to that of the longitudinal contact zones 254, 258.

Figure 15:
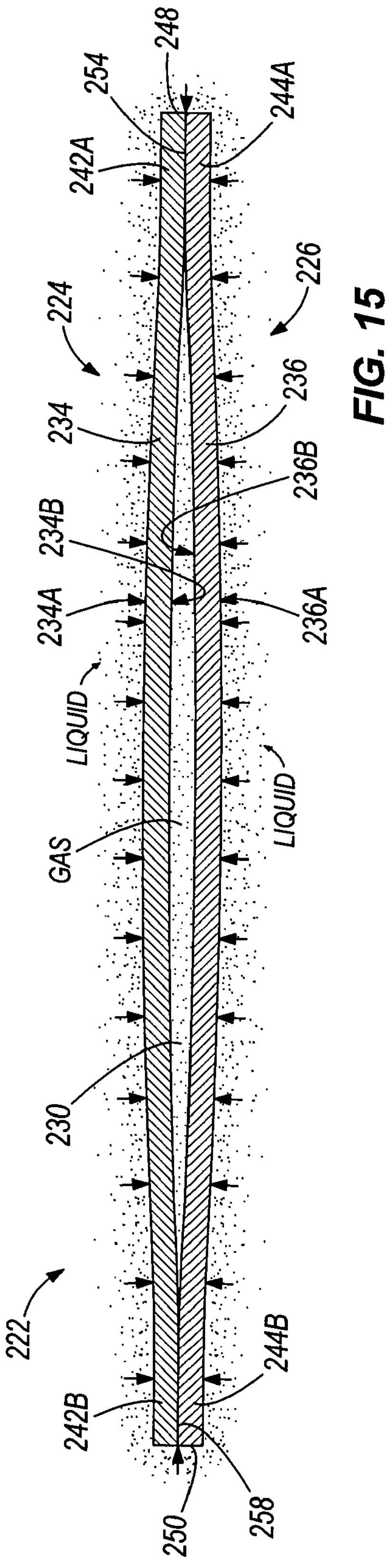
FIG. 15 is a section view similar to FIG. 14 illustrating the damper element in a first substantially deformed state resulting from a first surrounding liquid pressure.
Figure 16:
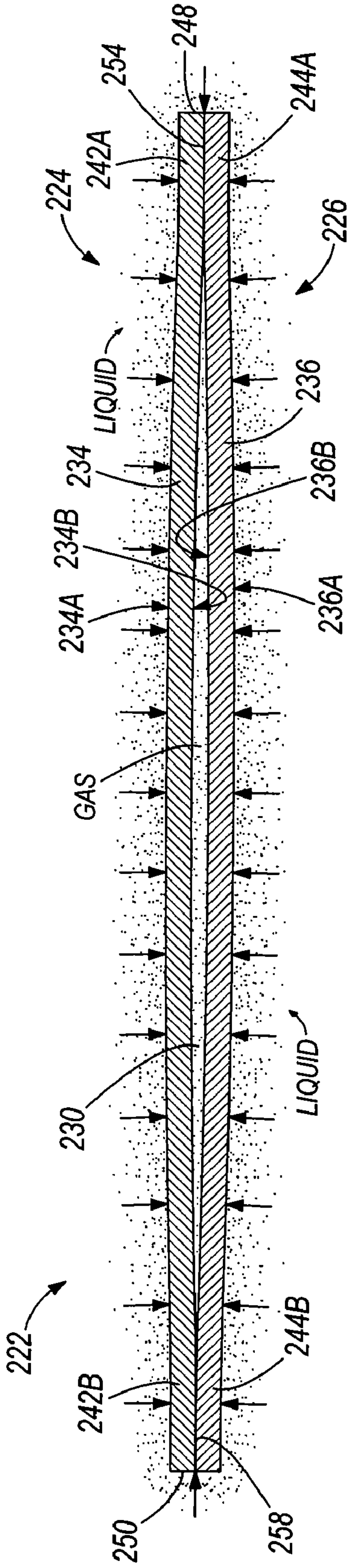
FIG. 16 is a section view similar to FIG. 15 illustrating the damper element in a second substantially deformed state resulting from a second surrounding liquid pressure.
Figure 17:
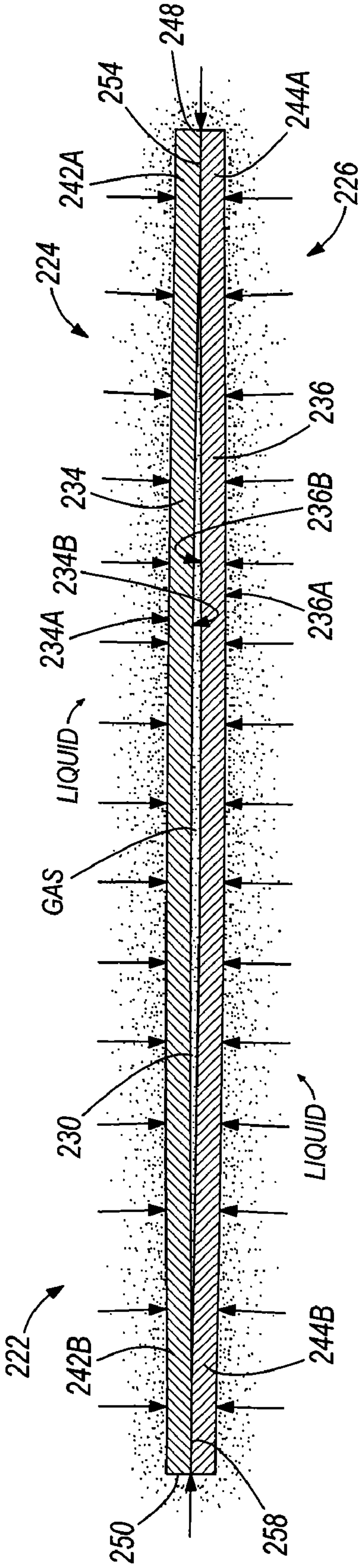
FIG. 17 is a section view similar to FIG. 16 illustrating the damper element in a third substantially deformed state resulting from a third surrounding liquid pressure.

The damper element 222 does not maintain a static shape during damping (see FIGS. 15-17). As fuel pressure outside the chamber 230 increases, the first and second wall portions 234, 236 move closer to one another, and the first and second edges 248, 250 move further apart. This is discussed in further detail below.

Figure 11:
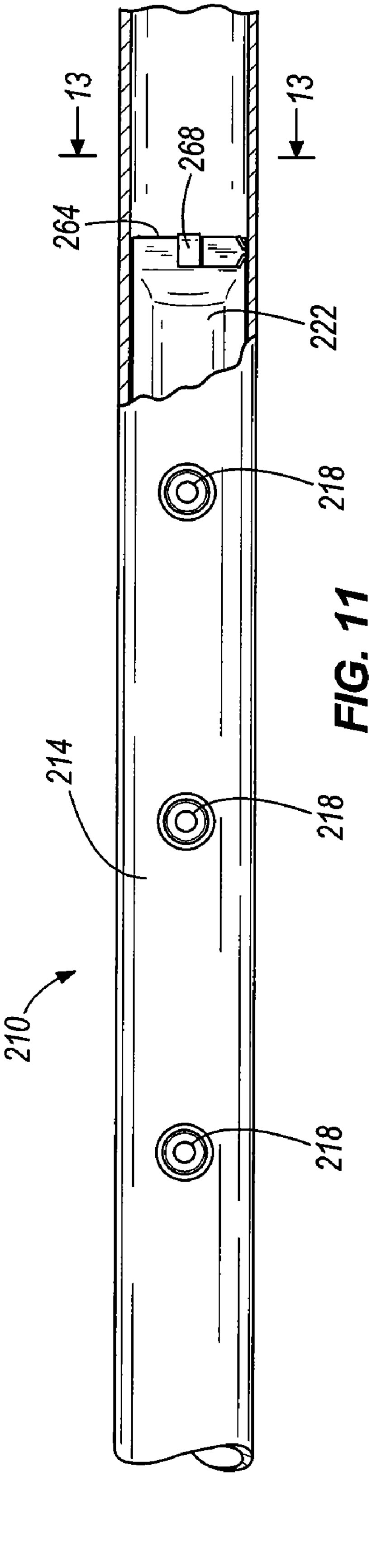
FIG. 11 illustrates a portion of a fuel rail, partially broken away, and containing a damper element embodying the invention.
Figure 18:
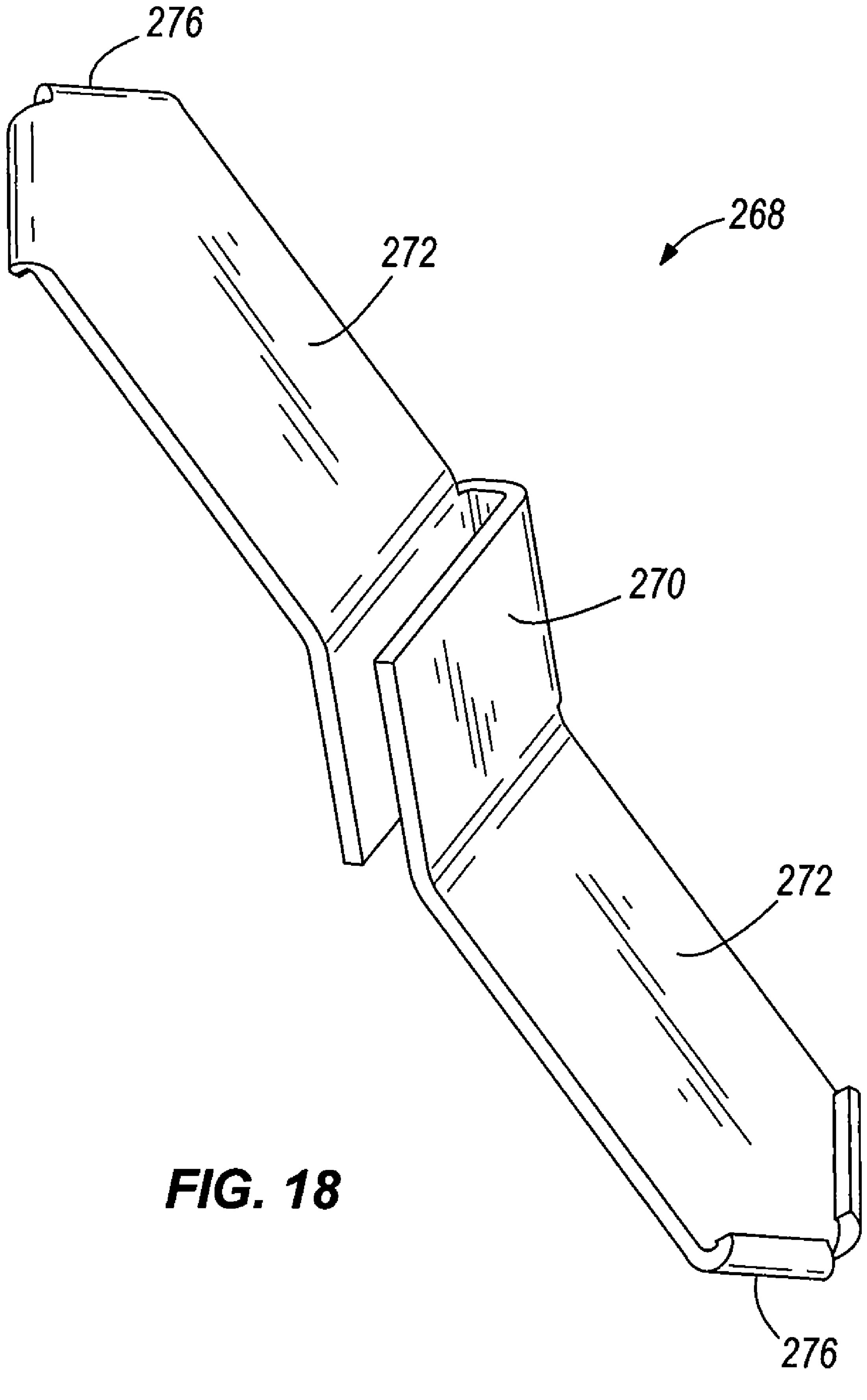
FIG. 18 is a perspective view of a retainer used with the damper element of FIGS. 11-17 inside the fuel rail as shown in FIGS. 11-13.

As shown in FIGS. 11-13, the damper element 222 is located centrally within the fuel rail 214 by a pair of retainers 268, one of which is shown in greater detail in FIG. 18. Each retainer 268 may be formed from a flat sheet (e.g., by stamping, bending, etc.). Each retainer 268 includes a central attachment portion 270 and a pair of extension portions 272 extending therefrom in opposite directions. The attachment portions 270 of the retainers 268 are pressed onto the respective first and second ends 262, 264 of the damper element 222. Each of the extension portions 272 terminates in a curled tip 276 that is adjacent the inner wall of the fuel rail 214 when the damper element 222 is in place. Although the damper element 222 may not be prevented from moving axially within the fuel rail 214 or rotating within the fuel rail 214, the retainers 268 generally keep the damper element 222 from contacting the inner wall of the fuel rail 214.

FIGS. 14-17 illustrate the damper element 222 in various stages of operation relative to increasing fuel pressures within the fuel rail 214. In FIG. 14, the damper element 222 is in an unstressed state while the fuel within the fuel rail 214 is not substantially pressurized above atmospheric pressure (e.g., during periods of non-use). FIG. 15 illustrates the damper element 222 in a first deformed state corresponding to a first positive pressure within the fuel rail 214. FIG. 16 illustrates the damper element 222 in a second deformed state corresponding to a second positive pressure within the fuel rail 214 that is greater than the first positive pressure. FIG. 17 illustrates the damper element 222 in a third deformed state corresponding to a third positive pressure within the fuel rail 214 that is greater than the second positive pressure. As the damper element 222 is deformed by external pressure to substantially flatten the first and second wall portions 234, 236 and reduce the volume of the chamber 230, the overall width of the damper element 222 (between the first and second edges 248, 250) is substantially free to increase in compensation. Meanwhile, the gas within the chamber 230 experiences an increase in pressure in reaction to the pressure incident on the damper element 222 from the surrounding fuel.

Figure 19:
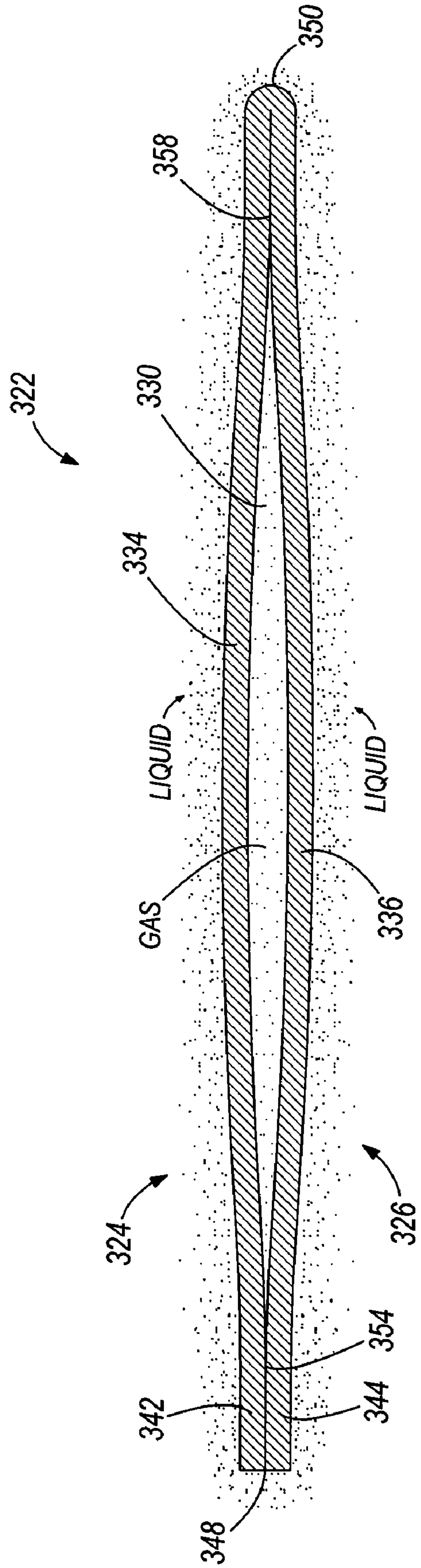
FIG. 19 is a section view of a damper element, similar to the damper element of FIGS. 11-17, embodying the invention.

A damper element 322 of a further embodiment is illustrated in cross-section in FIG. 19. The damper element 322 may be identical to the damper element 222 of FIGS. 11-17, except that the first side 324 and the second side 326 are formed from a single piece rather than being separate pieces joined together. For example, the first and second sides 324, 326 may be stamped from a single sheet and subsequently folded upon itself so that the first and second wall portions 334, 336 form the chamber 330. First and second respective flange portions 342, 344 of the first and second sides 324, 326 are overlapped and joined together to define a first longitudinally extending contact zone 354 along a first edge 348 of the damper element 322. The first and second flange portions 342, 344 may be welded or brazed together to seal the chamber, although alternate joining methods are optional. On the opposite side of the chamber 330, a fold crease defines a second longitudinally extending contact zone 358 between the first and second sides 324, 326 extending along a second edge 350 of the damper element 322. No additional joining or sealing means are necessary along this side of the damper element 322. The first and second sides 324, 326 of the damper element 322 are sealed at the respective ends as previously described.

Many of the aspects of the damper elements 222, 322 shown in FIGS. 11-17 and 19, respectively, and described above, are common to the damper element 22 shown in FIGS. 1-10. Although the damper element 22 shown in FIGS. 1-10 is formed from an outer tube 26 and an inner tube 38, each of the dual chambers 50, 54 that are formed in the damper 22 are similar to the single chambers 230, 330 of the respective damper elements 222, 322 of FIGS. 11-17 and 19. In this respect, many of the features described with particular reference to the dampers 222, 322 of FIGS. 11-17 and 19 are present in the damper 22 of FIGS. 1-10.

Various features and advantages of the invention are set forth in the following claims.

What is claimed is:

1. A damper element for damping pressure pulsations in a liquid, the damper element comprising:

a first side including a first wall portion at least partially defining a chamber containing a gas; and a second side including a second wall portion at least partially defining the gas-containing chamber, the second side overlappingly joined with the first side such that the first and second wall portions combine to define substantially an entire cross-section of the gas-containing chamber, wherein both the first and second wall portions are convexly curved outwardly away from the gas-containing chamber.

2. The damper element of claim 1, wherein the first wall portion is formed as a separate piece from the second wall portion.

3. The damper element of claim 2, wherein the first wall portion is stamped from a first sheet and the second wall portion is stamped from a second sheet.

4. The damper element of claim 2, wherein the first wall portion is part of a first tube and the second wall portion is part of a second tube.

5. The damper element of claim 2, wherein the first side and the second side define at least one longitudinally extending contact zone.

6. The damper element of claim 1, wherein the first wall portion is convexly curved outwardly away from the gas-containing chamber with a substantially constant radius.

7. The damper element of claim 6, wherein the second wall portion is substantially identical to the first wall portion and oriented in a mirrored relation to the first wall portion.

8. The damper element of claim 1, wherein the cross-sectional area of the gas-containing chamber is about 4 square millimeters when the damper element is in an unstressed state.

9. The damper element of claim 1, wherein the first side and the second side are formed as a single piece of material folded upon itself.

10. A damper element for damping pressure pulsations in a liquid, the damper element comprising:

a first side including a first wall portion;

a second side including a second wall portion, the second side being joined with the first side to define at least one longitudinally extending contact zone along which the first and second sides are overlapped; and a gas-containing chamber formed solely by the first wall portion and the second wall portion, both of the first and second wall portions being convexly curved outwardly away from the gas-containing chamber, each of the first and second wall portions defining a substantially constant radius of curvature in cross-section.

11. The damper element of claim 10, further comprising an overall length and an overall width, wherein a cross-sectional geometry of the gas-containing chamber through the overall width is uniform over substantially the entire overall length.

12. The damper element of claim 10, wherein the cross-sectional area of the gas-containing chamber is about 4 square millimeters when the damper element is in an unstressed state.

13. The damper element of claim 10, wherein the first wall portion is formed as a separate piece from the second wall portion.

14. The damper element of claim 13, wherein the first wall portion is stamped from a first sheet and the second wall portion is stamped from a second sheet.

15. The damper element of claim 13, wherein the first wall portion is part of a first tube and the second wall portion is part of a second tube.

16. The damper element of claim 10, wherein the first side and the second side are formed as a single piece of material folded upon itself.

17. A method of producing a damper element having a sealed, gas-containing chamber for damping pressure pulsations in a fuel rail, the method comprising:

stamping a first side of the damper element to include a first wall portion having a substantially constant radius;

stamping a second side of the damper element to include a second wall portion having a substantially constant radius; and joining the first and second sides so that the first and second wall portions define substantially an entire cross-section of the gas-containing chamber.

18. The method of claim 17, wherein the first and second sides of the damper element are stamped in a single sheet, and the method further comprising folding the single sheet upon itself.

19. The method of claim 17, wherein the first and second sides of the damper element are stamped separately and joined along two longitudinally extending edges.

* * * * *